(12) United States Patent
Berger et al.

(10) Patent No.: US 7,018,583 B2
(45) Date of Patent: Mar. 28, 2006

(54) METHOD FOR PRODUCING A COMPONENT BY MEANS OF POWDERY STARTING MATERIAL AND EXTRACTOR SUITABLE THEREFORE

(75) Inventors: Thomas Berger, Essen (DE); Henry Cohrt, Biebertal (DE); Heribert Dierkes, Hagen (DE)

(73) Assignee: Messer Griesheim GmbH, (DE)

( * ) Notice: Subject to any disclaimer, the term of this patent is extended or adjusted under 35 U.S.C. 154(b) by 314 days.

(21) Appl. No.: 10/240,999

(22) PCT Filed: Mar. 30, 2001

(86) PCT No.: PCT/EP01/03663

§ 371 (c)(1),
(2), (4) Date: Mar. 24, 2003

(87) PCT Pub. No.: WO01/74518

PCT Pub. Date: Oct. 11, 2001

(65) Prior Publication Data

US 2003/0218277 A1    Nov. 27, 2003

(30) Foreign Application Priority Data

Apr. 4, 2000    (DE) .............................. 100 16 695

(51) Int. Cl.
*B29C 35/04*    (2006.01)
(52) U.S. Cl. ...................... 264/645; 264/674; 264/677; 264/344
(58) Field of Classification Search ............... 264/645, 264/674, 677, 344
See application file for complete search history.

(56) References Cited

U.S. PATENT DOCUMENTS

| | | | | |
|---|---|---|---|---|
| 5,604,919 | A | * | 2/1997 | Sterzel et al. .................. 419/30 |
| 2002/0043737 | A1 | * | 4/2002 | Zhong et el. .................. 264/86 |

OTHER PUBLICATIONS

Shimizu et al, "A Debinding Method Using Supercritical CO2 on MIM Process," 1996, Adv. Powder Metall. Part. Mat., vol. 5, Nr. 19, pp. 207-212.*
R. M. German, "Powder Injection Molding," 1990, Metal Powder Indus. Fed., pp. 325-327,332-345.*

* cited by examiner

*Primary Examiner*—Mary Lynn Theisen

(57) ABSTRACT

According to a known method for producing a component by means of a powdery starting material, powder is mixed with auxiliaries comprising binding agents, whereby a free-flowing mass is produced. A green body is produced from the mass by means of powder injection moulding. A portion of the auxiliaries is extracted by heating the green body in a container and exposing said body to a stream of solvents. The green body is sintered, whereby the component is produced. The aim of the invention is to enable fast and gentle extraction for releasing green bodies which are produced by means of powder injection moulding. According to the invention, the extraction comprises a heating-up phase during which the temperature of the green body is permanently or gradually increased and the green body is overflown by solvent in the form of a compressed, supercritical treatment gas. An extractor that is suitable for carrying out said method is characterised by a pressure sealed housing that is provided with at least one lateral limiting wall and encloses a treatment chamber for receiving a carrier element which is loaded with a plurality of green bodies. Said housing is provided with a lock-up load and removal opening for the green bodies. Said opening is configured in the lateral limiting wall as a passage for the carrier element.

20 Claims, 1 Drawing Sheet

Figure 1:
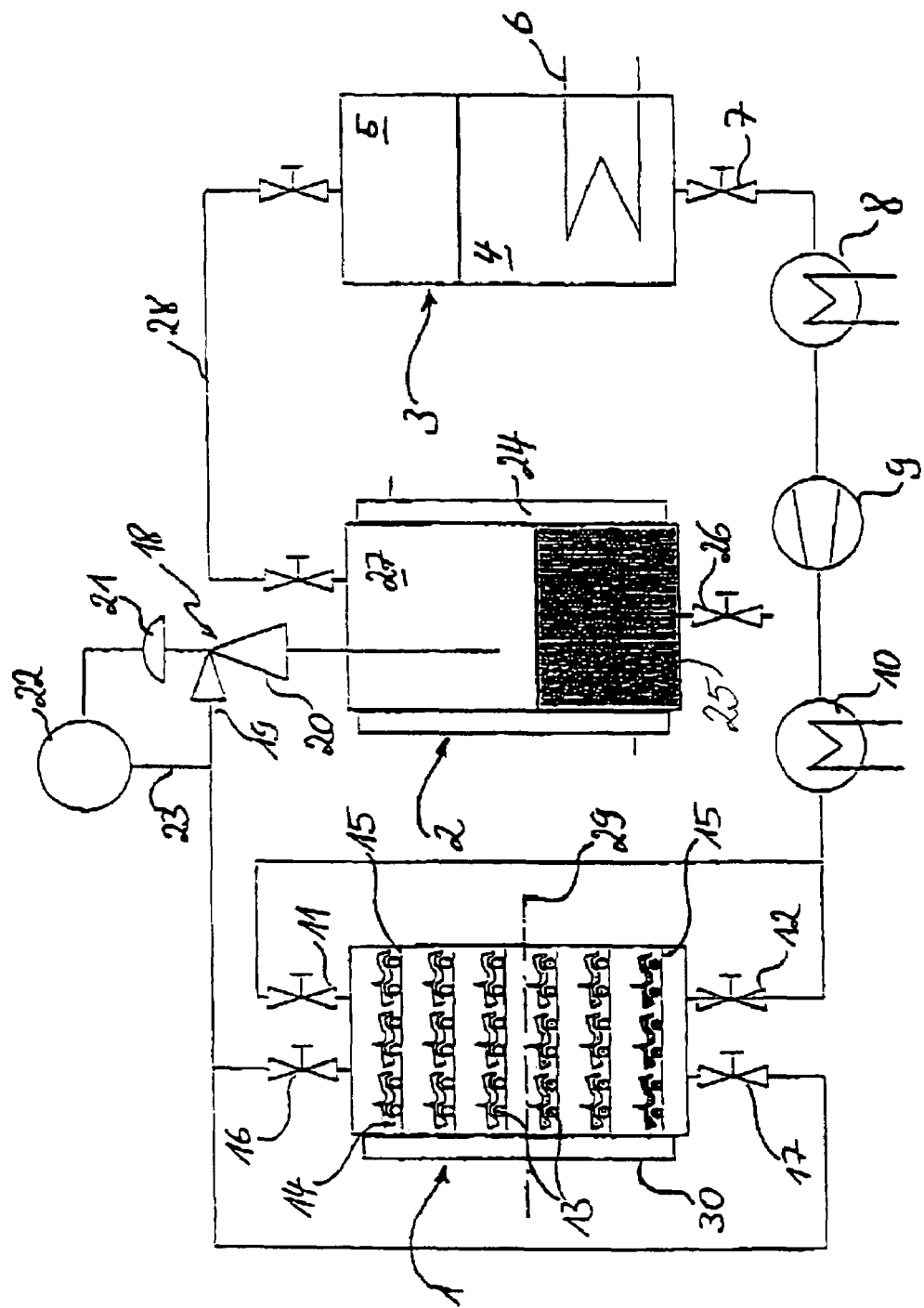

METHOD FOR PRODUCING A COMPONENT BY MEANS OF POWDERY STARTING MATERIAL AND EXTRACTOR SUITABLE THEREFORE

The invention relates to a method for producing a component from a pulverulent starting material by mixing the starting powder together with auxiliaries, comprising binders, resulting in the formation of a free-flowing mass, after which a preform is produced from the mass by means of powder injection molding, then some of the auxiliaries are extracted in that the preform is heated in a tank and exposed to a solvent stream, after which the preform is sintered, thus giving rise to the component.

Furthermore, the invention relates to an extractor for carrying out the method.

Powder injection molding is preferably used for the production of geometrically complex components in large numbers. Especially materials that are mechanically difficult to work such as, for instance, hard metals, ceramics and graphite, are easy to process with this method.

The process sequence for powder injection molding is described in the product information publication titled "Powder Metallurgical Injection Molding—an advanced manufacturing method" issued by Schunk Sintermetalltechnik GmbH (imprint: 52.02/1996). Here it is explained that powder injection molding can be broken down into several steps. Pulverulent starting material—as a rule metallic or ceramic powder or else graphite—is mixed with thermoplastic binders and plasticizers in a first process step to form a free-flowing mass. This mass can be processed on injection molding machines into preforms whose contours are close to the final shape. In order to remove the binders and plasticizers from the preform, it undergoes a so-called extraction or pyrolysis in a subsequent process step. During the extraction, the above-mentioned auxiliaries are chemically dissolved in a solvent and removed from the preform, whereas they are thermally broken down in the case of pyrolysis. The resultant brown blank is sintered in the next process step to form a metal, ceramic or graphite object.

The binders and plasticizers not only facilitate the processing of the mass but they also give the preform the necessary dimensional stability for its further processing. In order for the preform to retain its shape, the removal of these auxiliaries must be carried out gradually and gently. This applies especially to the extraction of the binders and plasticizers from preforms that have been made by means of powder injection molding. The reason is that, with this method, the preforms are generally de-molded before the extraction step and are consequently unsupported—freestanding or, for example, lying in a sand bed—when they are exposed to the solvent stream. This is why binder systems are used that are solid at room temperature and that can give the preforms the necessary dimensional stability at this temperature. The removal of the binders and plasticizers by means of pyrolysis—depending on the wall thickness of the preform—takes several days; extraction by means of solvents also calls for long treatment times. Moreover, solvents and some of the breakdown products of conventional binder systems have an adverse impact on the environment.

In order to conduct an extraction, a large number of the preforms from which the binder is to be removed are placed into an extraction tank as a bath and treated with the extraction agent.

Therefore, the invention is based on the objective of creating a method for extracting binders that allows quick and, at the same time, gentle binder removal from preforms that have been produced by means of powder injection molding.

Moreover, the invention is based on the objective of providing an extractor that is suitable for carrying out this method.

Regarding the method, this objective is achieved on the basis of the method mentioned above in that the extraction comprises a heating-up phase during which the temperature of the preform is continuously or incrementally increased and a solvent in the form of a compressed, supercritical treatment gas flows around the preform.

A solvent in the form of a supercritical treatment gas is used for the extraction of the auxiliaries from the preform. The treatment gas flows around the preform, dissolving auxiliaries—such as binders and plasticizers—which are subsequently discharged from the tank together with the treatment gas. In this process, the preform becomes more and more porous as a result of the removal of the auxiliaries, so that the treatment gas can also flow through the porous regions of the preform. The tank is a so-called extractor in which an excess pressure can be built up.

The supercritical treatment gas that is used as the solvent is characterized by a high density which, in turn, improves the solvent action vis-a-vis the auxiliaries that are to be dissolved from the preform. The high density is achieved in that the supercritical treatment gas is kept in a temperature-pressure regimen above its specific critical temperature and pressure values.

The extraction comprises a heating-up phase during which the temperature of the preform and consequently also the temperature of the treatment gas flowing around it is raised. The temperature is raised continuously or incrementally. The special action of this method is explained in greater detail below:

The auxiliaries contained in the preform are generally present in differing fractions that can vary, for example, in terms of their thermal properties—such as their melting temperature—or in their chemical and physical properties—such as their solubility in the treatment gas. An auxiliary fraction that has been removed from the preform by dissolution in a treatment gas or that has been liquefied through heat no longer contributes to the dimensional stability of the preform. By slowly raising the temperature of the preform during the extraction, it is achieved that the auxiliary fractions, as a function of their solubility in the treatment gas and of their melting temperature, are consecutively removed from the preform. First of all, the auxiliary fractions that are soluble at a low temperature are extracted, and those that do not dissolve as readily are extracted as the temperature rises. Here, in the ideal case, the auxiliary fractions are removed by dissolution in the treatment gas before their individual melting temperatures are reached.

The solubility of the auxiliaries in the supercritical treatment gas increases as a function of the temperature. If extraction were carried out at a low temperature, the removal of the auxiliaries would take a long time, but on the other hand, if extraction were conducted at a high temperature, the dimensional stability of the preform would be lost due to rapid removal or softening of the auxiliaries. Only raising the temperature gradually (continuously or incrementally) allows a gentle and, at the same time, rapid removal of the auxiliaries from the preform.

The essential precondition for this is the use of binder systems that are solid at room temperature, which allows such a gradual raising of the temperature without the preform losing its dimensional stability. Therefore, the method according to the invention can be used especially advantageously for the extraction of binders and plasticizers from those preforms that were made by means of powder injection molding and that, as a rule, had already been de-molded and were unsupported during the extraction, as a result of which they have to have sufficient dimensional stability on their own.

The temperature course during the extraction depends essentially on the thermal and chemical properties of the auxiliaries employed as well as on the geometrical dimensions of the preform. It has proven advantageous to establish a heating rate during the heating-up phase in the range from 0.1° C./min to 5° C./min [0.2° F./min to 9° F./min], preferably in the range from 0.5° C./min to 2° C./min [0.9° F./min to 3.6° F./min]. A heating rate in this range generally brings about a rapid and gentle extraction of the auxiliaries.

This applies equally to a mode of operation in which, during the heating-up phase, the temperature of the preform is raised to the range from 20° C. to 150° C. [68° F. to 302° F.], preferably from 30° C. to 130° C. [86° F. to 266° F.]. The heating-up phase can be followed by a holding phase during which the preform is kept at an elevated temperature. For reasons of achieving sufficient mechanical stability, the extraction is generally conducted in such a way that the preform retains only a residue of auxiliaries that does not impair the subsequent sintering.

The effect of the treatment gas in terms of removing the auxiliaries is improved if the treatment gas is imparted with a first flow direction, whereby the treatment gas flows around the preform in a first flow direction during the heating-up phase, and the flow direction is changed at least once during the course of the heating-up phase. This can be explained by the high density of the supercritical treatment gas that lies in the range of the specific density of the auxiliaries to be extracted. Due to the temperature rise, the density ratio of the treatment gas to the auxiliaries to be extracted changes over the course of the heating-up phase. At the beginning of the heating-up phase, that is to say, at low temperatures, the density of the treatment gas is higher than that of the auxiliaries. Preferably, the flow around the preform is from the bottom to the top so that the treatment gas can easily displace the auxiliaries upwards and discharge them from the extractor.

Thus, a mode of operation is preferred in which the flow around the preform is from the bottom to the top in a first time period of the heating-up phase, and from the top to the bottom in a second time period of the heating-up phase. After a reversal of the density ratios at a higher temperature, the auxiliaries are removed more efficiently from the preform and from the extractor by the treatment gas, which is now flowing from top to bottom. The temperature above which a reversal of the density ratio occurs depends on the internal pressure in the extractor.

The total duration of the extraction depends essentially on the wall thickness of the preform. It has proven to be advantageous to set the treatment duration of the preform in the range from one hour to three hours.

Propane, nitrous oxide or carbon dioxide have proven to be especially effective for use as the treatment gas in the sense of the invention. These treatment gases stand out for their good solvent properties vis-á-vis the conventional binders and plasticizers; they are inexpensive and relatively easy to handle.

It has proven to be advantageous to extract the auxiliaries while the preform is lying on a carrier made of a porous material. Should liquid auxiliaries emerge from the preform, they can be adsorbed or absorbed by the porous carrier material, thus preventing soiling or damage of the extractor or to other preforms. The carrier can be designed, for example, in the form of a plate made of porous ceramics or of porous sintered metal.

When it comes to the extractor, the above-mentioned technical objective is achieved in that it has a pressure-tight housing that is provided with at least one lateral limiting wall and that encloses a treatment chamber for receiving a carrier element which is loaded with a large number of preforms, whereby there is at least one inlet for a treatment gas and at least one outlet for a waste gas, and with a lockable loading and removal opening for the preforms, said opening being configured in the lateral limiting wall as a passage for the carrier element.

Since the loading and removal opening is configured as a passage for the carrier element, the entire carrier element can be inserted through this opening into the extractor and taken out again as well. The preforms can already be arranged on the carrier element before the loading of the extractor. After the extraction has been completed, the preforms are taken out of the extractor together with the carrier element and, lying on the carrier element, they can be conveyed to another processing device—for instance, a sintering oven.

Since the removal opening is configured in the lateral limiting wall, the carrier element can be inserted into the extractor by sliding it essentially horizontally, that is to say, without overcoming any major differences in height.

In a preferred embodiment of the extractor according to the invention, the housing is configured as a hollow cylinder with a closed front end, whereby the loading and removal opening is provided in the area of one front end. The two front ends form lateral limiting walls as defined by/.in the sense of the invention, whereby at least in the area of the one front end, the loading and removal opening is provided. A cylinder with a circular diameter is especially well-suited as the pressure tank. Here, the cylinder surface contributes to the lateral limitation of the treatment chamber and, at the same time, forms the upper and lower limiting wall.

Another improvement is attained when the treatment chamber has at least two inlets and at least two outlets. An extractor that has been modified in this manner is especially suitable for use in the variant described above of the method according to the invention in which the flow direction is reversed during the extraction.

Below, the invention will be explained in greater depth with reference to an embodiment and a drawing. The single figure shows:

FIG. 1 a device for carrying out the method according to the invention in a schematic representation.

The device shown in FIG. 1 serves for the extraction (hereinafter also referred to as binder removal) of preforms using supercritical carbon dioxide. The carbon dioxide is conveyed in a circulation system. The device comprises an extractor 1, a separator 2, and a $CO_2$ tank 3 for holding carbon dioxide.

In the $CO_2$ tank 3, the carbon dioxide is present in a liquid phase 4 and in a gas phase 5. In order to liquefy the carbon dioxide, there is a condenser 6 inside the $CO_2$ tank 3. From the $CO_2$ tank 3, there is a gas line that selectively runs via an outlet 7, a supercooler 8, a $CO_2$ pump 9 and a heat exchanger 10 either to an upper inlet 11 or to a lower inlet 12 of the extractor 1.

The extractor 1 has the shape of a hollow cylinder, whereby in the representation of FIG. 1, the cylinder axis 29 runs horizontally. In the area of one of the front ends, there is a filling and removal opening that can be sealed pressure-tight by means of a flap 30. Inside the extractor 1, there is a mobile rack 15 with several intermediate trays on which a large number of preforms 13 are arranged for purposes of binder removal. The preforms 13 lie on plates 14 made of porous sintered metal. Through the filling and removal opening, the rack 15 can be inserted into the extractor and taken out of it.

Inside the extractor 1, there is also a heating device (not shown in the figure). In an alternative embodiment, the extractor 1 is surrounded by the heating device. The extractor can be connected to the separator 2 either by means of an upper outlet 16 or a lower outlet 17 and by a right-angle valve 18.

The high-pressure side 19 of the right-angle valve in FIG. 1 is indicated with a smaller triangle and the low-pressure side 20 is indicated with a larger triangle. The right-angle valve 18 is regulated by a pneumatic device 21 and a pressure regulator 22. The pressure regulator 22 is connected via a pressure line 23 to the high-pressure side 19 of the right-angle valve.

The separator 2, in which the binder and the plasticizer are separated from gaseous carbon dioxide, is surrounded by a temperature regulator 24. The components that condense out of the carbon dioxide form an extract 25 that consists essentially of waxes, paraffins and resins and that can be drained via a connection piece 26. The gas space 27 above the extract 25 is connected via a gas line 28 to the gas phase 5 of the $CO_2$ tank 3.

Below, the method according to the invention for the gentle extraction of auxiliaries from preforms using supercritical carbon dioxide will be explained in greater depth with reference to FIG. 1:

The extractor 1 is loaded with a batch of preforms 14 in that the preforms 14 to be treated are arranged on the rack 15 outside of the extractor 1 and the rack is subsequently slid horizontally into the extractor 1.

The preforms are cast parts that have been made of a mixture of carbonyl iron powder and auxiliaries, such as binders and plasticizers, by means of powder injection molding. The auxiliaries are combined below under the term "binders". Relative to the total weight, the proportion of binders is 6% to 9% by weight. The various binder fractions are contained in differing quantitative proportions. The binder fractions differ in terms of their melting temperature and their solubility in supercritical carbon dioxide.

In the $CO_2$ tank 3, carbon dioxide is kept at a temperature of about 20° C. [68° F.] and at a pressure in the range from 55 bar to 60 bar. In this process, a phase equilibrium is established with the formation of the gas phase 5 and the liquid phase 4. Liquid carbon dioxide is continuously removed from the liquid phase 4 and conveyed via the supercooler 8 and the $CO_2$ pump 9 under a pressure of 200 bar to 500 bar as carbon dioxide to the heat exchanger 10. As a rule, a pressure of 350 bar is established in the extractor 1.

The binder removal according to the invention comprises a heating-up phase during which the temperature of the stream of supercritical carbon dioxide that is continuously fed through the extractor 1 is slowly raised. The temperature of the carbon dioxide is regulated in the heat exchanger 10. In the embodiment, an incremental temperature increase is established according to the following table:

TABLE 1

Temperature course during the extraction with supercritical $CO_2$

| No. | Duration [min] | Temperature [° C./° F.] |
|---|---|---|
| 1 | 25 | 30/86 |
| 2 | 15 | 50/122 |
| 3 | 15 | 70/158 |
| 4 | 15 | 90/194 |
| 5 | 20 | 120/248 |

As an alternative to the incremental temperature increase, the temperature can also be increased continuously. In an accordingly modified embodiment, the temperature of the supercritical carbon dioxide is regulated by the heat exchanger 10, whereby a continuous temperature increase from 30° C. to 120° C. [86° F. to 248° F.] at a heating rate of 1° C. [1.8° F.] per minute is established.

From the heat exchanger 10, the continuous stream of supercritical carbon dioxide enters the extractor 1, flows around the porous preforms 14, thus dissolving components of the binder contained therein. The amount of the carbon dioxide to be used depends on the weight of material from which the binder is to be removed. In the embodiment, 10 kg of supercritical carbon dioxide per kilogram of the starting weight of the preforms is used.

The gradual temperature increase brings about a steady dissolution of the various binder fractions so that sufficient dimensional stability of the preforms 14 is ensured during the binder removal. Moreover, a liquefaction of the binder is avoided in that low-melting fractions are already dissolved before their melting temperature has been reached. Any liquid that nevertheless emerges is absorbed by the porous plates 13.

Due to the temperature increase, over the course of the heating-up phase, there is a change in the destiny ratio of the supercritical carbon dioxide to the binder to be extracted. Therefore, at the beginning of the heating-up phase, the stream of supercritical carbon dioxide flows from the lower inlet 12 to the, upper outlet 16. As a result of the flow direction that is established in this manner, binder components whose density is less than that of the supercritical carbon dioxide are displaced upwards and discharged from the extractor. After a reversal of the above-mentioned density ratio, which occurs as a function of the selected binder system at an internal pressure of 350 bar at a temperature in the range from 70° C. to 90° C. [158° F. to 194° F.], the flow direction is changed in that the carbon dioxide stream now flows from the upper inlet 11 to the lower outlet 17 so that the binder components that now have a higher density can more easily be removed via the lower outlet 17.

Subsequent to the heating-up phase, the preforms 14 are kept at a temperature of 120° C. [248° F.] for a holding time of 20 minutes, whereby the supercritical carbon dioxide continues to flow around them. The extraction is terminated when only a residue of binders is present in the preforms 14, which is necessary for the stability of the preforms 14 until they are sintered. This residual fraction amounts to about 20% by weight. Consequently, in the embodiment, the extraction is completed after 90 minutes.

The binder components discharged from the extractor 1 reach the separator 2 and condense or crystallize there as a result of cooling off through the expansion of the carbon dioxide. The purified carbon dioxide is then conveyed back to the $CO_2$ tank 3.

Through the use of supercritical carbon dioxide as the extraction agent and due to its good dissolving and transport properties, which can be precisely regulated by means of the temperature control in the heat exchanger 10, the binder removal times are shortened to just a few hours. The method according to the invention allows the extract 25 to be used again, thus alleviating the negative impact on the environment. The solvent carbon dioxide is also conveyed in a circulation system.

After the binder removal, the flap 30 is opened, the rack 15 is slid out of the extractor 1 and the preforms 14 resting on it are taken to a sintering oven (not shown in FIG. 1) for the finishing of the desired components. The sintering oven is likewise configured to receive the rack 15 so that the treated preforms 14 do not have to be transferred. They are subsequently sintered at a temperature of 1000° C. to 1350° C. [1832° F. to 2462° F.].

The invention claimed is:

1. A method for producing a component from a pulverulent starting material by mixing a powder together with auxiliaries, comprising binders, resulting in the formation of a free-flowing mass, after which a preform is produced from the mass by means of powder injection molding, then some of the auxiliaries are extracted in that the preform is heated in a tank and exposed to a solvent stream, after which the preform is sintered, thus giving rise to the component, characterized in that the extraction comprises a heating-up phase during which the temperature of the pre-form is continuously or incrementally increased and a solvent in the form of a compressed, supercritical treatment gas flows around the preform, and further characterized in that, during the heating-up phase, a heating rate is set in the range from 0.1° C./min to 5° C./min [0.2° F./min to 9° F./min].

2. The method according to claim 1, characterized in that the heating rate range is from 0.5° C./min to 2° C./min [0.9° F./min to 3.6° F./min].

3. The method according to claim 2, characterized in that, during the heating-up phase, the temperature of the preform is raised to the range from 20° C. to 150° C. [68° F. to 302° F.].

4. The method according to claim 3, characterized in that the temperature is from 30° C. to 130° C. [86° F. to 266° F.].

5. The method according to claim 1, characterized in that, during the heating-up phase, the temperature of the preform is raised to the range from 20° C. to 150° C. [68° F. to 302° F.].

6. The method according to claim 4, characterized in that the treatment gas is imparted with a first flow direction, and the treatment gas flows around the preform in the flow direction during the heating-up phase, and in that the flow direction is changed at least once during the course of the heating-up phase.

7. The method according to claim 1, characterized in that the flow around the pre-form is from the bottom to the top in a first time period of the heating-up phase, and from the top to the bottom in a second time period of the heating-up phase.

8. The method according to claim 1, characterized in that the treatment duration of the preform is set in the range from one hour to three hours.

9. The method according to claim 1, characterized in that the preform lies on a carrier made of a porous material during the extraction of the auxiliaries.

10. A method for producing a component from a pulverulent starting material by mixing a powder together with auxiliaries, comprising binders, resulting in the formation of a free-flowing mass, after which a preform is produced from the mass by means of powder injection molding, then some of the auxiliaries are extracted in that the preform is heated in a tank and exposed to a solvent stream, after which the preform is sintered, thus giving rise to the component, characterized in that the extraction comprises a heating-up phase during which the temperature of the pre-form is continuously or incrementally increased and a solvent in the form of a compressed, supercritical treatment gas flows around the preform, and further characterized in that the treatment gas is imparted with a first flow direction, and the treatment gas flows around the preform in the flow direction during the heating-up phase, and in that the flow direction is changed at least once during the course of the heating-up phase.

11. The method according to claim 10, characterized in that the flow around the pre-form is from the bottom to the top in a first time period of the heating-up phase, and from the top to the bottom in a second time period of the heating-up phase.

12. The method according to claim 10, characterized in that the flow around the pre-form is from the bottom to the top in a first time period of the heating-up phase, and from the top to the bottom in a second time period of the heating-up phase.

13. The method according to claim 11, characterized in that the treatment duration of the preform is set in the range from one hour to three hours.

14. The method according to claim 10, characterized in that the treatment duration of the preform is set in the range from one hour to three hours.

15. The method according to claim 13, characterized in that the treatment gas is selected from the group consisting of propane, nitrous oxide and carbon dioxide.

16. The method according to claim 10, characterized in that the treatment gas is selected from the group consisting of propane, nitrous oxide and carbon dioxide.

17. The method according to claim 15, characterized in that the preform lies on a carrier made of a porous material during the extraction of the auxiliaries.

18. The method according to claim 10, characterized in that the preform lies on a carrier made of a porous material during the extraction of the auxiliaries.

19. An extractor for producing a component from a pulverent starting material comprising a pressure-tight housing that is provided with at least one lateral limiting wall, the housing enclosing a treatment chamber for receiving a carrier element which is loaded with a large number of preforms, whereby there is at least one inlet for a treatment gas and at least one outlet for a waste gas, and with a lockable loading and removal opening for the preforms, said opening being configured in the lateral limiting wall as a passage for the carrier element, and the housing is configured as a hollow cylinder with a closed front end, whereby the loading and removal opening is provided in the area of one front end.

20. The extractor according to claim 19, characterized in that the treatment chamber has at least two inlets and at least two outlets.

* * * * *